Nov. 2, 1965    R. HILL    3,214,942
COUPLING ACCOMMODATING RADIAL DEVIATION BETWEEN TWO SHAFTS
Filed Feb. 11, 1964    3 Sheets-Sheet 1
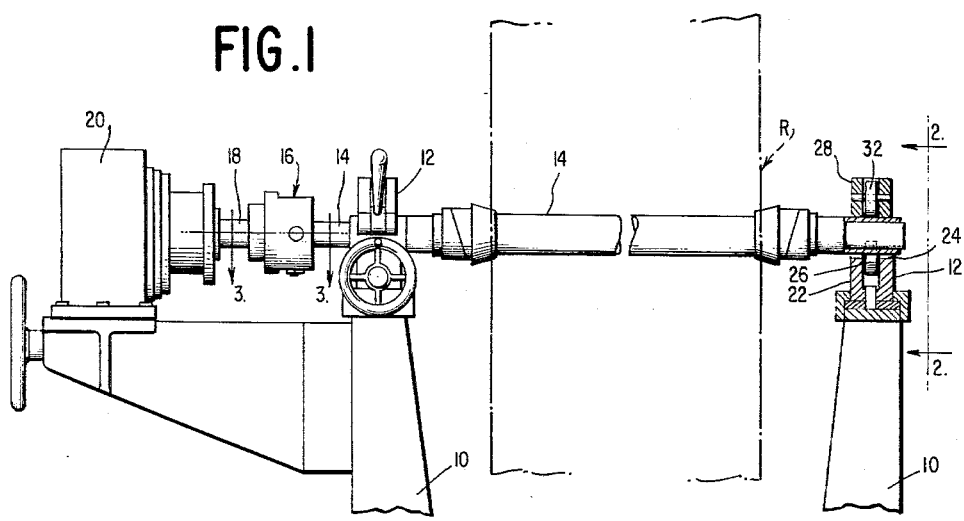
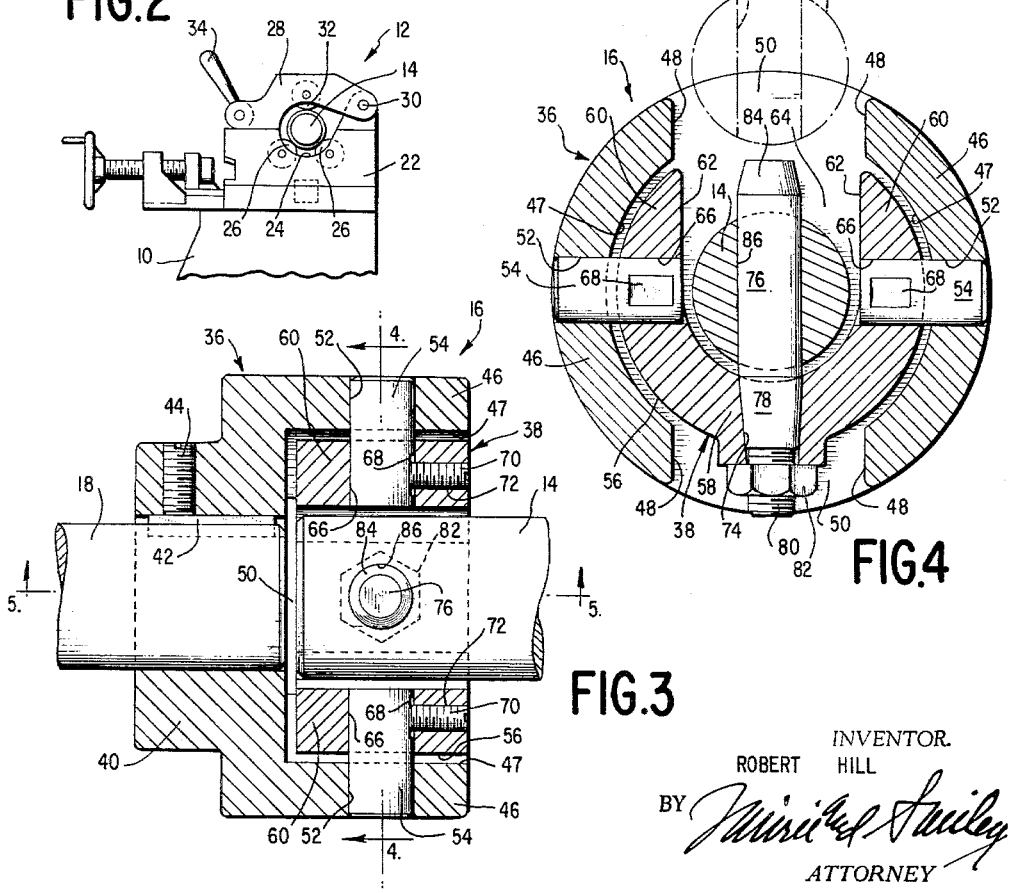
INVENTOR.
ROBERT HILL
ATTORNEY Nov. 2, 1965   R. HILL   3,214,942
COUPLING ACCOMMODATING RADIAL DEVIATION BETWEEN TWO SHAFTS
Filed Feb. 11, 1964   3 Sheets-Sheet 2

INVENTOR.
ROBERT HILL
BY
ATTORNEY

Nov. 2, 1965 R. HILL 3,214,942
COUPLING ACCOMMODATING RADIAL DEVIATION BETWEEN TWO SHAFTS
Filed Feb. 11, 1964 3 Sheets-Sheet 3

INVENTOR.
ROBERT HILL
BY
ATTORNEY

# United States Patent Office 3,214,942
Patented Nov. 2, 1965

3,214,942
COUPLING ACCOMMODATING RADIAL
DEVIATION BETWEEN TWO SHAFTS
Robert Hill, Sandston, Va., assignor to The Inta-Roto
Machine Company, Inc., Richmond, Va., a corporation
of Virginia
Filed Feb. 11, 1964, Ser. No. 344,029
10 Claims. (Cl. 64—31)

This invention relates to means for coupling aligned shafts, and more particularly to a universal type of coupling that will permit deviation between axially aligned shafts in a radial direction.

In the winding and unwinding of long strips of web material, large rolls of the web material are mounted on core shafts which are journaled in roll stands and coupled at one end to the spindle of a power means, such as a drive system or a brake system, depending upon whether the particular stand is at the winding or unwinding end of the apparatus. The rolls of web material have considerable weight and it is desired to keep the weight of the core shafts upon which they are mounted to a minimum.

As a result, the loaded core shafts tend to sag slightly in the middle between the journals of a roll stand so that the ends of the shafts beyond the journals tend to incline upwardly rather than to remain on a fixed axis. However, this shaft must be coupled at one end to a power means either for driving or braking the shaft and heretofore the wear and tear on the coupling devices has been excessive because they have had to resist the tendency toward relative orbital movement of the coupling part connected to the end of the core shaft.

Moreover, the prior coupling mechanisms have required the loosening and/or dismantling of the coupling mechanism, attachment of one coupling part to the shaft to be connected, and the reassembling or tightening the mechanism to be operative. This has required a substantial amount of time and labor, and increased costs.

Having in mind the defects of the prior art apparatus, it is the primary object of the present invention to provide a coupling mechanism for connecting two generally axially aligned shafts and which will accommodate radial deviation from such axis by one of the shafts.

It is another object of the invention to provide a coupling mechanism capable of readily connecting one shaft to another without the necessity of loosening or dismantling the coupling parts, or specifically attaching a coupling part to the one shaft prior to the actual coupling thereof.

It is still another object of the invention to provide a coupling mechanism that becomes operative to couple one shaft to another merely by mounting the one shaft in operative position.

It is a further object of the invention to provide a universal type of coupling mechanism that will accommodate radial deviation or relative orbital movement between the axes of the coupling parts, and which has simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a side view in elevation of a roll stand including a coupling device in accordance with the present invention;

FIG. 2 is a fragmentary end view in elevation of the roll stand taken on line 2—2 of FIG. 1, and illustrating a typical journal therefor;

FIG. 3 is an enlarged, fragmentary, cross-sectional view taken on line 3—3 of FIG. 1, showing a coupling mechanism according to the invention;

FIG. 4 is a cross-sectional view taken on line 4—4 of FIG. 3;

Figure 8:
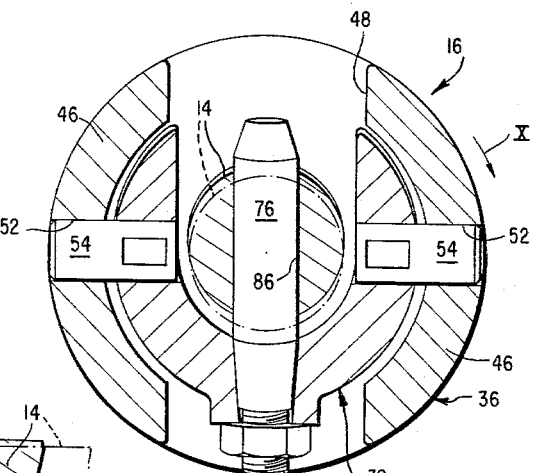
FIG. 8 is a cross-sectional view taken on line 8—8 of FIG. 7.
Figure 9:
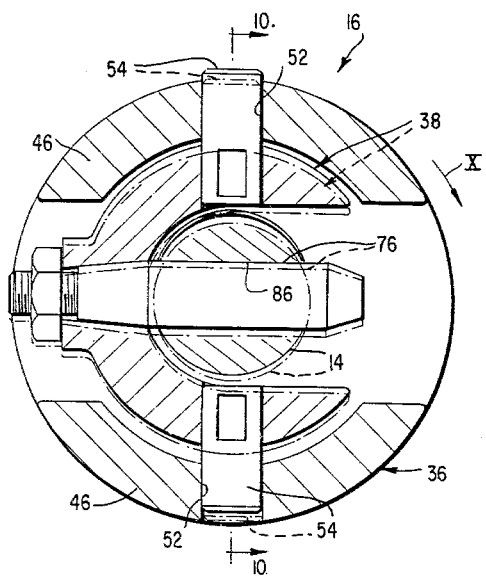
Figure 11:
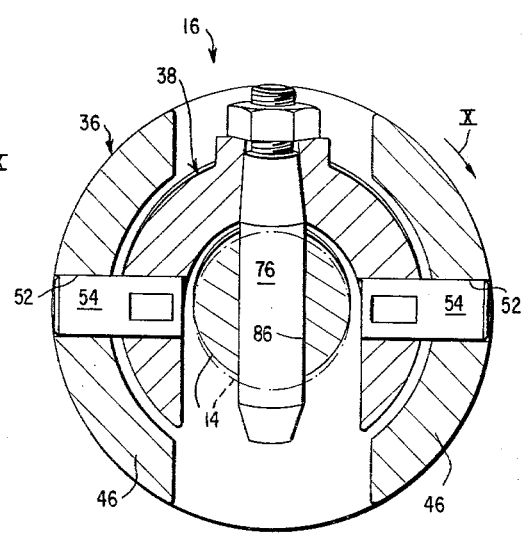
Figure 12:
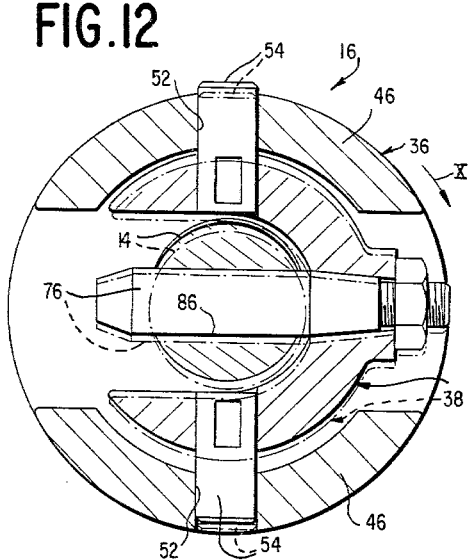
Figure 10:
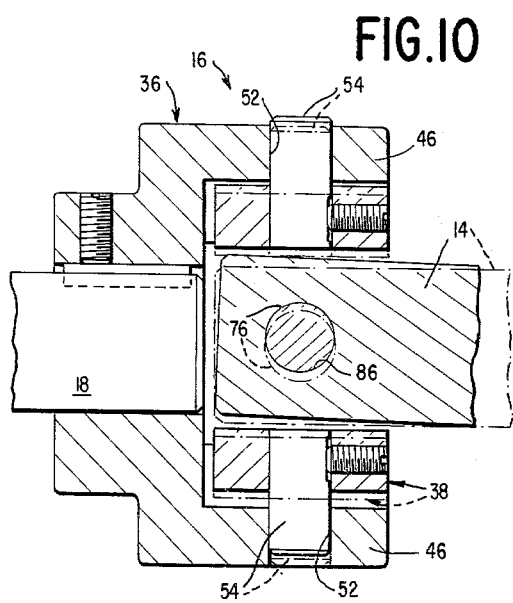

FIGS. 9, 11 and 12 are cross-sectional views similar to FIG. 8, but showing the coupling turned 90°, 180° and 270°, respectively, and illustrating the relatively orbital movement within the coupling during rotation, and FIG. 10 is a cross-sectional view taken on line 10—10 of FIG. 9.

Referring now to the drawings, specifically to FIG. 1, a typical roll stand comprises a pair of spaced standards 10 each supporting a spindle journal 12 at the upper end thereof for removably receiving a core shaft 14 adapted to removably support a roll R of sheet material. The shaft 14 is releasably connected by a coupling 16 with a spindle 18 of a power unit 20 which may be a drive unit for driving the core shaft 14 to take up or wind the sheet material on the roll R, or a brake unit for retarding rotation of the core shaft 14 if the roll R is a supply from which the sheet material is being drawn.

The journal 12, as shown in FIG. 2, is of standard, well-known construction and includes a base 22 having a recess 24 to accommodate the shaft 14 and pivotally supporting a pair of rollers 26 journaled on axes disposed in a horizontal plane and parallel to each other and the axis of the shaft 14. The peripheries of the rollers 26 extend within the area of the recess 24 and directly support the shaft 14. The shaft is retained in position by a lever journal 28 mounted at one end to the base 22 by a pivot 30 on one side of the recess 24 and carrying a roller 32 which engages the upper periphery of the shaft. The other end of lever 28 is releasably secured to the base 22 on the opposite side of the recess 24 by lock means including an operating handle 34.

Figure 5:
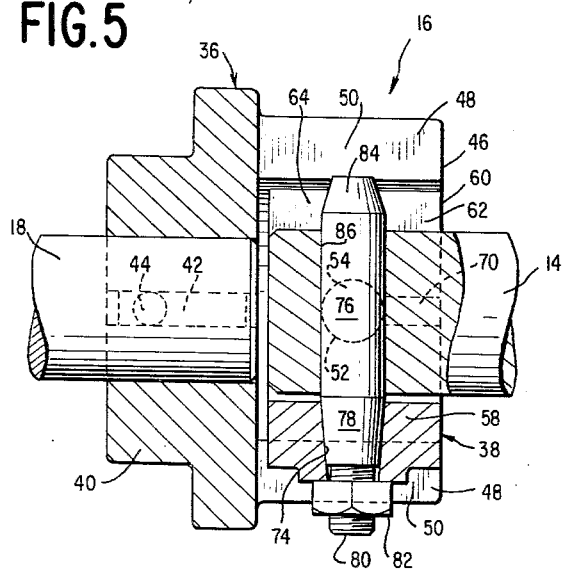
FIG. 5 is a cross-sectional view taken on line 5—5 of FIG. 3.

The coupling 16 according to the present invention, as shown in FIGS. 3–5, is superficially similar to a universal joint in that it comprises an outer envelope portion 36 secured to one shaft, and an inner coupling portion 38 connected to the outer portion for pivotal movement about an axis perpendicular to the shaft axis and also connected to the other shaft for pivotal movement about an axis perpendicular to both the shaft axis and the pivotal axis between the parts 36 and 38. Unlike a universal joint, however, the arrangement is such as to accommodate sliding movement along said perpendicular axes, whereas the pivotal movement about said axes is limited.

More specifically, the envelope portion 36 comprises a hub 40, preferably secured on the power spindle 18 by a key 42 and set screw 44, and two oppositely disposed arcuate segmental portions 46, preferably having cylindrical inner walls 47, and whose ends 48 are uniformly spaced to define a passageway 50 diametrically therebetween. The segmental portions 46 each have a bore 52 coaxial to each other and radial of the axis of said portions 46 and hub 40, and a pin 54 is pivotally and slidably mounted in each bore 52.

The inner coupling portion 38 of the coupling 16 comprises a yokelike or U-shaped member preferably having a cylindrical outer wall 56, the radius of which is somewhat less than that of the walls 47 of the segmental portions 46. While the walls 47 and 56 are shown as cylindrical, it is obvious that they may be spherical, rectangular or other configuration as long as there is a substantial space between said walls when said member and portions are coaxial. The yoke member 38 includes a bight portion 58 and two uniformly disposed arms 60 having substantially parallel inner walls 62 spaced about the same as the end walls 48 of the segmental portions 46 and defining a channel 64 within the yoke member 38 of approximately the same width as the passageway 50.

The arms 60 of the yoke member 38 are each provided with a bore 66, said bores being coaxial and disposed radially of the axis of the yoke member to coincide with the axis of the bores 52 of the outer member 36, and receives the inner ends of the pins 54. To retain the pins 54 in position, they are each provided with a flat 68 to be engaged by a set screw 70. Obviously, the pins 54 may be fixed relative to either of the members, but it is preferred that they be fixed to the inner member 38 to prevent their protruding into the channel 64. Accordingly, the arms 60 of the yoke 38 are shown as having internally threaded bores 72 extending axially from the outer sides of said arms and receiving the set screws 70. The bores 52 and 66 and pins 54 are arranged to align the channel 64 with the slot or passageway 50.

The bight portion 58 of the yoke member 38 is provided with a bore 74 radial to the axis of the coupling and aligned centrally between the arms 60, and a pin 76 is mounted in the bore 74. The bore 74 preferably is slightly conical and tapers inwardly from the channel 64 to the outer side of the bight 58, and the pin 76 has a correspondingly conical base portion 78 for firmly nesting in said bore 74, and a threaded shank 80 engaged by a nut 82 on the outer side of the bight 58 for securing the pin 76. The nut 82 and pin 76 are readily accessible respectively through the opposite ends of the passageway 50 in the event that replacement is necessary.

The pin 76 is of a length to extend substantially the full depth of the channel 64 and is cylindrical the major portion of its length, but preferably has a tapered free end portion 84 to facilitate mating the pin with a diametrically extending bore 86 in the core shaft 14 adjacent its coupling end. The dimensions of the channel 64, including its bight portion, are somewhat greater than the diameter of the core shaft 14 so that there is clearance on all sides of the core shaft, especially that portion adjacent the inner wall of the bight 58.

Figure 6:
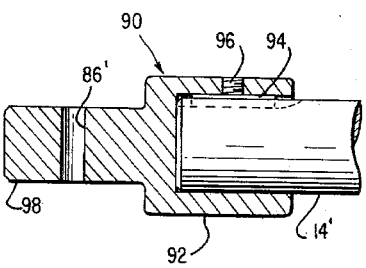
FIG. 6 is a fragmentary, cross-sectional view of an adaptor modification for core shafts.

Prior core shafts may not be capable of adoption for cooperation with the present coupling in that they may not have sufficient length to accommodate a diametrical bore 86. In such event, a shaft 14' may be fitted with an adapter 90, as shown in FIG. 6, which comprises a socket 92 to be secured on the end of the shaft by suitable means, such as a key 94 and possibly a set screw 96, and a shaft extension 98 having a diametrical bore 86' therein for receiving the coupling pin 76. The set screw 96 may be omitted to permit a limited axial movement between the adapter 90 and core shaft 14'.

In operation, to effect coupling or uncoupling of a core shaft 14 or 14', it is merely necessary to turn the power spindle 18 and coupling 16 until the passageway 50 is disposed vertically with the channel 64 open upwardly, as shown in FIG. 4. The journal levers 28 are unlocked and the levers swung to open position. If a core shaft 14 is to be removed, it may be both dismounted and uncoupled simultaneously merely by lifting it vertically until its bore 86 is removed from the pin 76, as shown in phantom lines in FIG. 4, and its end clears the outer portion 36 of the coupling. At this elevation, the end portions of the shaft will also clear the journals 12. The operation is reversed to mount and simultaneously couple a core shaft.

Figure 7:
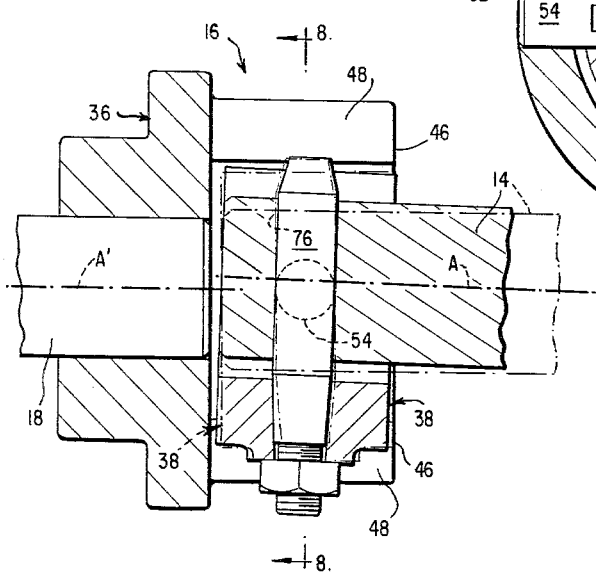
FIG. 7 is a cross-sectional view similar to FIG. 5, but illustrating the radial deviation of the end of a loaded core shaft.

In FIGS. 3–5, the end of the core shaft 14 is shown in normal axial position. However, when the core shaft 14 is loaded with a roll R, the weight of the roll causes the shaft to sag in the middle between the journals 12. As a result, the coupling end of the shaft tends to incline upwardly from the adjacent journal 12 so that the axis A of the shaft end not only is at slight angle but also is radially displaced above the axis A' of the power spindle 18 and coupling 16. This condition is illustrated in full line in FIGS. 7 and 8 in which the so-called normal axial position is shown in phantom line. In this position, the shaft 14 has risen slightly on the pin 76 and the yoke 38 has pivoted slightly on the pins 54.

As the coupling and shaft rotate in the direction of the arrow X, FIG. 8, the shaft end remains in its upwardly angled and radially displaced position. Consequently, as the coupling rotates 90°, as shown in FIG. 9, the shaft 14 is centered on the pin 76 but the yoke 38 is lifted relative to the outer portion 36, the pins 54 sliding within the bores 52, and the shaft 14 turning slightly about the pin 76 relative to the yoke 38, as shown in FIG. 10.

With continued rotation through another 90° (180° from starting position), the yoke 38 is again centered, but in inverted position and pivoted slightly on the pins 54 as the shaft 14 slides on the pin 76 toward the bight 58, as shown in FIG. 11. Further rotation through another 90° (270° from starting position) causes the shaft 14 to again center on the pin 76 but, as shown in FIG. 12, to lift the yoke 38 in the opposite relation to that of FIG. 9, the pins 54 again sliding in the bores 52.

From the foregoing, it is evident that the axis of the end of the shaft 14 will deviate between an unloaded position in which it is coaxial with the outer coupling member 36 and power spindle 18, and a loaded position in which it is displaced upwardly both radially and angularly. Such deviation is readily accommodated by the slidable and pivotal connection of the shaft, by means of the pin 76 and shaft bore 86, with the yoke 38 and the similar slidable and pivotal connection of the yoke 38, by means of the pins 54 and bores 52, with the outer member 36. This results in a relative orbital movement between the shaft axis A and the coupling axis A' when the shaft is loaded, but avoids any undue stress or wear on the coupling per se.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A coupling for connecting two generally axially aligned shafts and adapted to accommodate relative radial deviation between such shafts, comprising an outer part including a hub portion for mounting on a shaft and a shell-like envelope portion coaxial with said hub portion and open opposite said hub portion, an inner part disposed within said envelope and having outer dimensions less than those of the envelope inner walls to provide clearance therebetween, means pivotally and slidably connecting said inner part and envelope on a first axis perpendicular to the coupling axis of the envelope, said inner part having an axially disposed opening accessible through the wall thereof corresponding to the open side of said envelope, a shaft portion constituting an axial continuation of a second shaft, and insertable in said inner part opening, the dimensions of said shaft portion being less than those of said inner part opening to provide clearance therebetween, and means pivotally and slidably connecting said shaft portion and inner part on a second axis perpendicular to both said coupling axis and said first axis.

2. A coupling according to claim 1, wherein said shaft portion comprises an adaptor including means for removably connecting it with a shaft in axial alignment therewith.

3. A coupling according to claim 1, wherein said shaft portion constitutes the end of a second shaft.

4. A coupling according to claim 1, wherein said envelope has a gap, said inner part opening being constituted by a channel opening through the periphery of said part, said first axis means connecting said parts with said channel opening aligned with said gap with the plane thereof perpendicular to said first axis, and said second axis means comprising a pin carried by said inner part centrally of said channel and a diametral bore in said shaft portion for mating with said pin.

5. A coupling for connecting two generally axially aligned shafts and adapted to accommodate relative radial deviation between such shafts, comprising an outer part including a hub portion for mounting on a shaft and an annular envelope portion coaxial with said hub portion, said annular envelope being open opposite said hub portion and having an axially disposed slot, an inner part disposed within said envelope and having outer dimensions less than those of the envelope inner walls to provide clearance therebetween, said inner part being U-shaped in cross section and defining a channel of substantially the same width as said slot, said envelope and inner part each having diametrically disposed bores whose axes are perpendicular to the coupling axis of said envelope and also perpendicular to the median plane of said slot and channel, a pair of pins respectively mounted in said bores on each side of said channel and pivotally and slidably connecting said inner part and envelope with said channel aligned with said slot, and a pin fixed to said inner part centrally within said channel on an axis perpendicular to both said coupling axis and said bore axis, whereby a shaft whose dimensions are less than those of said channel and having a diametrically disposed bore adjacent the end thereof may be inserted through said slot into said channel with its bore mating said pin and be capable of sliding and pivotal movement on said pin.

6. A coupling for connecting two generally axially aligned shafts and adapted to accommodate relative radial deviation between such shafts, comprising an outer part including a hub portion for mounting on a shaft and an annular envelope portion coaxial with said hub portion, said annular envelope being open opposite said hub portion and having an axially disposed slot, an inner part disposed within said envelope and having outer dimensions less than those of the envelope inner walls to provide clearance therebetween, said inner part being U-shaped in cross section and defining a channel of substantially the same width as said slot, said envelope and inner part each having diametrically disposed bores whose axes are perpendicular to the coupling axis of said envelope and also perpendicular to the median plane of said slot and channel, a pair of pins respectively mounted in said bores on each side of said channel and pivotally and slidably connecting said inner part and envelope with said channel aligned with said slot, a pin fixed to said inner part centrally within said channel on an axis perpendicular to both said coupling axis and said bore axis, and a shaft portion constituting an axial continuation of a second shaft and having a diametrically disposed bore adjacent the end thereof, whereby said shaft portion may be inserted through said slot into said channel with its bore mating said pin, the dimensions of said shaft portion being less than those of said channel to provide clearance therebetween and accommodate sliding and pivotal movement of said shaft portion on said pin.

7. A coupling for connecting two generally axially aligned shafts and adapted to accommodate relative radial deviation between such shafts, comprising an outer part including a hub portion for mounting on a shaft and an annular envelope portion coaxial with said hub portion, said annular envelope comprising two diametrically disposed arcuate segments whose ends are spaced and define an axially extending diametrically disposed slot, an inner part disposed between said segments and having outer dimensions less than those of the inner walls of the segments to provide clearance therebetween, said inner part being U-shaped in cross section and defining a channel of substantially the same width as said slot, said segments and inner part each having diametrically disposed bores whose axes are perpendicular to the coupling axis of said outer part and also perpendicular to the median plane of said slot and channel, a pair of pins respectively mounted in said bores on each side of said channel and pivotally and slidably connecting said inner part and outer part with said channel aligned with said slot on one side of said envelope, said inner part having a radial bore centrally within said channel on an axis perpendicular to both said coupling axis and said pin axis and being exposed through said slot on the other side of said envelope, a coupling pin having a base portion seated in said latter bore and having a threaded shank extending beyond said inner part, and a nut threaded on said shank and rigidly securing said pin, whereby said coupling pin and said nut are readily accessible through the opposite ends of said slot for replacement of said pin.

8. A coupling according to claim 7 wherein said coupling pin has a length substantially equal to the depth of said channel and is cylindrical the major portion of its length but has a tapered free end.

9. A coupling according to claim 8 wherein said coupling pin bore is conically tapered inwardly from its channel end to its outer end, and the base portion of said coupling pin is similarly conically tapered at seat firmly therein.

10. A coupling according to claim 9 comprising means releasably securing said pair of pins to said inner part.

References Cited by the Examiner

UNITED STATES PATENTS

| 1,178,529 | 4/16 | Loomis | 64—31 |
| 1,988,967 | 1/35 | Emrick | 64—6 |
| 2,778,302 | 1/57 | Reinartz | 64—31 X |
| 3,106,078 | 10/63 | Turinsky | 64—31 |

FOREIGN PATENTS

| 1,258,411 | 3/63 | France. |

BROUGHTON G. DURHAM, *Primary Examiner.*